United States Patent
He et al.

(10) Patent No.: US 11,593,582 B2
(45) Date of Patent: Feb. 28, 2023

(54) METHOD AND DEVICE FOR COMPARING MEDIA FEATURES

(71) Applicant: BEIJING BYTEDANCE NETWORK TECHNOLOGY CO., LTD., Beijing (CN)

(72) Inventors: Yi He, Beijing (CN); Lei Li, Beijing (CN); Cheng Yang, Beijing (CN); Gen Li, Beijing (CN); Yitan Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 292 days.

(21) Appl. No.: 16/979,784

(22) PCT Filed: Dec. 29, 2018

(86) PCT No.: PCT/CN2018/125502
§ 371 (c)(1),
(2) Date: Sep. 10, 2020

(87) PCT Pub. No.: WO2019/184523
PCT Pub. Date: Oct. 3, 2019

(65) Prior Publication Data
US 2021/0042569 A1      Feb. 11, 2021

(30) Foreign Application Priority Data
Mar. 29, 2018   (CN) .......................... 201810273673.2

(51) Int. Cl.
G06V 20/40     (2022.01)
G06K 9/62      (2022.01)
G06V 10/75     (2022.01)

(52) U.S. Cl.
CPC .......... *G06K 9/6215* (2013.01); *G06V 10/751* (2022.01); *G06V 20/46* (2022.01); *G06V 20/48* (2022.01)

(58) Field of Classification Search
CPC .... G06K 9/6215; G06V 10/751; G06V 20/46; G06V 20/48; G06V 10/761; G06F 17/00
See application file for complete search history.

(56) References Cited

U.S. PATENT DOCUMENTS 9,547,715 B2 * 1/2017 Lu .......................... G06F 16/683
11,182,426 B2 * 11/2021 Li ........................... G06F 16/632
(Continued)

FOREIGN PATENT DOCUMENTS

CN      102117313 A    7/2011
CN      105426884 A    3/2016
(Continued)

OTHER PUBLICATIONS

Singapore Patent Application No. 11202000106W; Written Opinion; dated Dec. 11, 2021; 6 pages.
(Continued)

*Primary Examiner* — Aaron W Carter
(74) *Attorney, Agent, or Firm* — BakerHostetler

(57) ABSTRACT

The disclosure is related to a method and device for comparing media features, the method comprising: obtaining first media feature sequences of a first media object and second media feature sequences of a second media object, the first media feature sequence comprises a plurality of first media feature units arranged in sequence, and the second media feature sequence comprises a plurality of second media feature units arranged in sequence; determining unit similarities between the first media feature units and the second media feature units; determining a similarity matrix between the first media feature sequences and the second (Continued)

media feature sequences according to the unit similarities; determining a similarity of the first media object and the second media object according to the similarity matrix.

18 Claims, 12 Drawing Sheets

(56) References Cited

U.S. PATENT DOCUMENTS

| | | | |
|---|---|---|---|
| 11,265,598 B2* | 3/2022 | He | H04N 21/44008 |
| 2003/0185450 A1* | 10/2003 | Garakani | G06V 20/40 |
| | | | 382/232 |
| 2005/0074168 A1* | 4/2005 | Cooper | G06V 20/40 |
| | | | 707/E17.028 |
| 2005/0123053 A1* | 6/2005 | Cooper | G11B 27/28 |
| | | | 375/240.2 |
| 2006/0080095 A1* | 4/2006 | Pinxteren | G06F 16/683 |
| | | | 704/233 |
| 2006/0080100 A1* | 4/2006 | Pinxteren | G10L 25/48 |
| | | | 704/E11.002 |
| 2006/0107216 A1 | 5/2006 | Cooper et al. | |
| 2008/0205773 A1* | 8/2008 | Ma | G06V 20/52 |
| | | | 382/225 |
| 2010/0188580 A1* | 7/2010 | Paschalakis | G06V 20/40 |
| | | | 348/E5.062 |
| 2011/0026761 A1* | 2/2011 | Radhakrishnan | |
| | | | H04N 21/44008 |
| | | | 382/100 |
| 2012/0005208 A1* | 1/2012 | Guralnik | G06F 16/70 |
| | | | 707/E17.028 |
| 2013/0046399 A1* | 2/2013 | Lu | G06F 16/683 |
| | | | 700/94 |
| 2014/0267779 A1 | 9/2014 | Schmidt et al. | |
| 2014/0324836 A1* | 10/2014 | Chittar | G06V 10/242 |
| | | | 707/722 |
| 2015/0146973 A1* | 5/2015 | Yang | G06K 9/6235 |
| | | | 382/159 |
| 2018/0053039 A1 | 2/2018 | Anders et al. | |
| 2021/0042569 A1* | 2/2021 | He | G06V 10/751 |
| 2021/0058667 A1* | 2/2021 | He | H04N 21/23418 |
| 2021/0073262 A1* | 3/2021 | Li | G06F 16/41 |
| 2021/0165827 A1* | 6/2021 | Li | G06F 16/683 |
| 2021/0263923 A1* | 8/2021 | Uchida | G06F 16/2462 |

FOREIGN PATENT DOCUMENTS

| | | |
|---|---|---|
| CN | 106034240 A | 10/2016 |
| CN | 106919662 A | 7/2017 |
| JP | 2007-226071 A | 9/2007 |
| JP | 2010-062649 A | 3/2010 |
| JP | 2010-191934 A | 9/2010 |
| JP | 2014-006912 A | 1/2014 |
| JP | 2014-506366 A | 3/2014 |
| JP | 2017-033169 A | 2/2017 |
| WO | WO 2012/093339 A2 | 7/2012 |

OTHER PUBLICATIONS

International Patent Application No. PCT/CN2018/125502; Int'l Search Report; dated Apr. 2, 2019; 2 pages.

Singapore Patent Application No. 11202000106W; Search Report and Written Opinion; dated Dec. 28, 2020; 8 pages.

* cited by examiner

METHOD AND DEVICE FOR COMPARING MEDIA FEATURES

CROSS REFERENCE TO Related APPLICATIONS

This application is the U.S. National Stage of International Application No. PCT/CN2018/125502, filed on Dec. 29, 2018, which claims the priority of Chinese patent application No, 201810273673,2, filed on Mar. 29, 2018, which is incorporated herein by reference in its entirety.

FIELD

The present disclosure relates to the technical field of media processing, in particular to a method and a device for comparing media features.

BACKGROUND

Media features such as video features and audio features (or media fingerprints), media feature comparison and media feature retrieval are widely used in our "multimedia, information society". The comparison of media features may avoid the repeated uploading of videos and audios, thus preventing the embezzlement of media and optimizing the storage of media. In addition, the comparison of media features may also be used for media content monitoring, copyright detection, etc.

The existing media feature comparison methods are poor in accuracy and efficiency, which causes huge consumption of computing resources and storage resources.

SUMMARY OF THE INVENTION

The object of the present disclosure is to provide a new method and device for comparing media features.

The object of the present disclosure is to be realized by adopting the following technical scheme. The method for comparing media features proposed according to the disclosure includes the following steps: obtaining first media feature sequences of a first media object and second media feature sequences of a second media object, the first media feature sequence comprises a plurality of first media feature units arranged in sequence, and the second media feature sequence comprises a plurality of second media feature units arranged in sequence; determining unit similarities between the first media feature units and the second media feature units; determining a similarity matrix between the first media feature sequences and the second media feature sequences according to the unit similarities; and determining a similarity of the first media object and the second media object according to the similarity matrix.

The object of the present disclosure can be further realized by adopting the following technical measures.

The method for comparing media features aforementioned, wherein, the first media feature units and the second media feature units are floating point number features; the determining unit similarities between the first media feature units and the second media feature units comprises: determining the unit similarities according to a cosine distance between the first media feature units and the second media feature units.

The method for comparing media features aforementioned, wherein, the first media feature units and the second media feature units are binary features and have the same feature unit length; the determining unit similarities between the first media feature units and the second media feature units comprises: determining the unit similarities according to a Hamming distance between the first media feature units and the second media feature units.

The method for comparing media features aforementioned, wherein, the obtaining first media feature sequences of a first media object and second media feature sequences of a second media object comprises: obtaining various types of first media feature sequences of the first media object, and obtaining various types of second media feature sequences of the second media object; the determining unit similarities between the first media feature units and the second media feature units comprises: determining the unit similarity between the first media feature units and the second media feature units of the same type separately, so as to obtain the various unit similarities; the determining a similarity matrix between the first media feature sequences and the second media feature sequences according to the unit similarities comprises: determining an average value or minimum value of the various unit similarities, and determining the similarity matrix according to the average value or minimum value of the various unit similarities.

The method for comparing media features aforementioned, wherein the plurality of first media feature units are arranged in chronological order in the first media feature sequences, and the plurality of second media feature units are arranged in chronological order in the second media feature sequences.

The method for comparing media features aforementioned, wherein one point in the similarity matrix corresponds to one unit similarity, and the points of the similarity matrix are arranged according to the sequence of the first media feature units in the first media feature sequences in a transverse direction and according to the sequence of the second media feature units in the second media feature sequences in a longitudinal direction.

The method for comparing media features aforementioned, wherein the determining a similarity of the first media object and the second media object according to the similarity matrix comprises: determining a similarity and matching segments of the first media object and the second media object according to a straight line in the similarity matrix.

The method for comparing media features aforementioned, wherein the determining a similarity of the first media object and the second media object according to a straight line in the similarity matrix comprises: defining a plurality of straight lines with a slope being a preset slope value as candidate straight lines, and according to an average value or sum value of unit similarities contained in each candidate straight line, determining a linear similarity of the candidate straight line; from the plurality of candidate straight lines, selecting and defining one candidate straight line with the maximum linear similarity as a first matching straight line; determining the similarity of the first media object and the second media object according to the linear similarity of the first matching straight line;

and determining a start and end time of matching segments of the first media object and the second media object according to a start point and an end point of the first matching straight line.

The method for comparing media features aforementioned, wherein a plurality of preset slope values are set, and the candidate straight line is a straight line with a slope equal to any one of the plurality of preset slope values.

The method for comparing media features aforementioned, wherein the determining a similarity of the first media object and the second media object according to the similarity matrix comprises: selecting a plurality of points with the maximum unit similarity from the similarity matrix as similarity extreme points; fining a straight line in the similarity matrix as a second matching straight line based on the similarity extreme points; determining the similarity of the first media object and the second media object according to an average value or sum value of unit similarities contained in the second matching straight line; and determining a start and end time of matching segments of the first media object and the second media object according to a start point and an end point of the second matching straight line.

The method for comparing media features aforementioned, wherein the fitting a straight line in the similarity matrix as a second matching straight line based on the similarity extreme points comprises: fitting a straight line with a slope equal to or close to the preset slope value in the similarity matrix by using a random sample consensus method as the second matching straight line.

The method for comparing media features aforementioned, wherein the determining a similarity of the first media object and the second media object according to the similarity matrix further comprises: judging whether points at a start and an end of the first matching straight line or second matching straight line reach a preset unit similarity value, removing portions of the start and the end that do not reach the preset unit similarity value, and keeping and defining a middle segment of the straight line as a third matching straight line; and determining the similarity of the first media object and the second media object according to the linear similarity of the third matching straight line, and determining a start and end time of matching segments according to a start point and an end point of the third matching straight line.

The object of the present disclosure is also realized by adopting the following technical scheme. A device for comparing media features proposed according to the present disclosure, comprising: a media feature sequence obtaining module, configured to obtain first media feature sequences of a first media object and second media feature sequences of a second media object, wherein the first media feature sequence comprises a plurality of first media feature units arranged in sequence, and the second media feature sequence comprises a plurality of second media feature units arranged in sequence; a unit similarity determining module, configured to determine unit similarities between the first media feature units and the second media feature units; a similarity matrix determining module, configured to determine a similarity matrix between the first media feature sequences and the second media feature sequences according to the unit similarities; and a similarity determining module, configured to determine a similarity of the first media object and the second media object according to the similarity matrix.

The object of the present disclosure can be further realized by adopting the following technical measures.

The device for comparing media features aforementioned, further comprising a module for performing the steps of any one of the aforementioned.

The object of the present disclosure can be realized by adopting the following technical measures. A hardware device for comparing media features proposed according to the disclosure, comprising: a memory, configured to store non-transitory computer readable instructions; and a processor, configured to execute the computer readable instructions, wherein, when the computer readable instructions are executed by the processor, such that the method for comparing media features according to any one of the aforementioned.

The object of the present disclosure can be realized by adopting the following technical measures. A terminal equipment proposed according to the disclosure, comprising the device for comparing media features according to any one of the aforementioned.

The object of the present disclosure can be realized by adopting the following technical measures. A computer readable storage medium for storing non-transitory computer readable instructions proposed according to the disclosure, wherein, when the non-transitory computer readable instruction are executed by a computer, such that the computer perform the method for comparing media features according to any one of the aforementioned.

The above description is only an overview of the technical scheme of the present disclosure. In order to have a better understanding of the technical means of the present disclosure, it can be implemented in accordance with the contents of the description, and to make the above and other purposes, features and advantages of the present disclosure more obvious and understandable, the following is a preferred embodiment, and is described in detail with the accompanying drawings.

DETAILED DESCRIPTION OF THE EMBODIMENTS

In order to further elaborate the technical means and efficacy adopted by the present disclosure to achieve the intended invention purpose, the following is a detailed description of the specific implementation, structure, features and efficacy of the comparison method and device of media features proposed according to the present disclosure in combination with the attached drawings and preferred embodiments.

Figure 1:
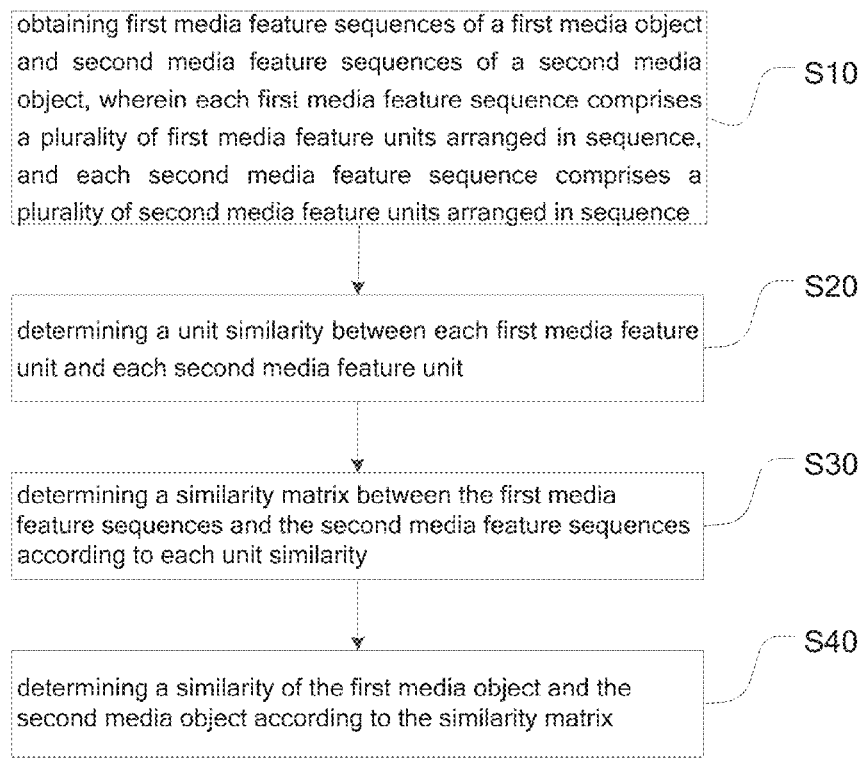
FIG. 1 is a flowchart of a method for comparing media features according to one embodiment of the present disclosure.

FIG. 1 is a schematic flowchart of a method for comparing media features according to one embodiment of the present disclosure. Referring to FIG. 1, the method for comparing media features in the disclosed example mainly includes the following steps:

S10: a media feature sequence of a first media object is obtained as a first media feature sequence, and a media feature sequence of a second media object is obtained as a second media feature sequence. The first media object and the second media object are two media to be compared, for example, various types of media such as audio, video, a set of burst photos, etc. The media feature sequence may be audio features, video features or image features, etc. In fact, video objects may be compared by obtaining the audio features of the video objects according to the method of the present disclosure.

Specifically, the first media feature sequence includes a plurality of first media feature units arranged in sequence, and the second media feature sequence includes a plurality of second media feature units arranged in sequence. It may be assumed that the lengths of the first media feature sequence and the second media feature sequence are $M_1$ and $M_2$ respectively, wherein $M_1$ and $M_2$ are positive integers, that is, the first media feature sequence includes $M_1$ first media feature units and the second media feature sequence includes $M_2$ second media feature units. Then proceed to S20.

Further, in some embodiments, "arranged in sequence" herein means that the plurality of first/ second media feature units are arranged in chronological order in the first/second media feature sequence: for example, in the process of extracting media features in advance, frame extraction is conducted on the media objects first, then a media feature unit is generated according to each frame, so that each media feature unit corresponds to each frame of the media objects, and then the media feature units are arranged according to the chronological order of each frame in the media objects to obtain the media feature sequences. Therefore, the aforementioned media feature unit may also be referred to as frame feature, and the aforementioned media feature sequence may be referred to as media feature.

It is worth noting that there are no restrictions on the extraction methods of the media feature sequences and the types of the media feature sequences, but the first media feature sequence and the second media feature sequence should be the same type of media features obtained by the same feature extraction method. In one example of the present disclosure, floating point number feature sequences of the first media object and the second media object may be simultaneously obtained as the first media feature sequence and the second media feature sequence, and each media feature unit in the floating point number feature sequences is a floating point number. In another example, binary feature sequences of the first media object and the second media object may also be obtained at the same time, or other types of media features obtained may be binarized to obtain binary feature sequences. Each feature unit in the binary feature sequences is a bit string composed of 0 and 1, and the media feature units extracted by the same method have the same length (or called bit number).

S20: the unit similarity between each first media feature unit and each second media feature unit is determined to obtain $M_1 \times M_2$ unit similarities. Each unit similarity is used to indicate the similarity of two media feature units, specifically, the greater the unit similarity, the more similar the units. Then proceed to S30.

Specifically, a distance or measure which may be used for judging the similarity of the two media features may be selected as the unit similarity according to the type of the media features.

In the embodiment of the present disclosure, when the first media feature sequence and the second media feature sequence are floating point number features at the same time, the unit similarity may be determined according to the cosine distance (or called cosine similarity) between the first media feature unit and the second media feature unit; generally, the cosine distance may be directly determined as the unit similarity.

In the embodiment of the present disclosure, when the first media feature sequence and the second media feature sequence are binary features at the same time, the unit similarity may be determined according to the Hamming distance between the first media feature unit and the second media feature unit. Specifically, the Hamming distance between the first media feature unit and the second media feature unit is calculated first, then the difference between the length of the feature units (bit number) and the Hamming distance is calculated, and the ratio of the difference to the length of the feature units is determined as the unit similarity to represent the proportion of the same bits in the two binarized features. The Hamming distance is a common measure in the field of information theory. The Hamming distance between two equal-length strings is the number of different characters in the corresponding positions of the two strings. In actual calculation of the Hamming distance, XOR operation may be conducted on the two strings, and the number of results being 1 is counted, which is the Hamming distance.

It is worth noting that it is not limited to using cosine distance or Hamming distance to represent the unit similarity, but any distance or measure which may be used for judging the similarity of the two media feature units may be used.

It should be noted that if each media feature unit corresponds to each frame of the media objects, the unit similarity may also be referred to as inter-frame similarity.

S30: a similarity matrix between the first media feature sequence and the second media feature sequence is determined according to each unit similarity.

Specifically, each point in the similarity matrix corresponds to a unit similarity, so that the similarity matrix records the unit similarity between each first media feature unit and each second media feature unit. Moreover, the points of the similarity matrix are arranged according to the sequence of the first media feature units in the first media feature sequence in the transverse direction and according to the sequence of the second media feature units in the second media feature sequence in the longitudinal direction. In this way, the point located in the i-th row and the j-th column represents the unit similarity between the i-th first media feature unit of the first media object and the j-th second media feature unit of the second media object, and the similarity matrix is an $M_1 \times M_2$ matrix. Then proceed to S40.

Figure 2:
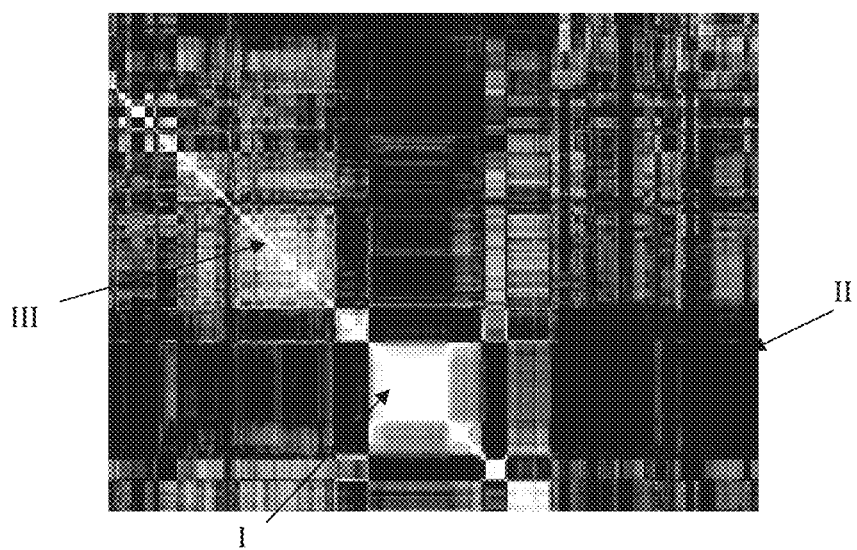
FIG. 2 is a gray scale diagram corresponding to a similarity matrix according to one embodiment of the present disclosure.

For the purpose of visualization, the similarity matrix may be converted into a gray scale diagram as shown in FIG. 2, in which the gray scale of each point is used to represent the size of the unit similarity at a corresponding position in the similarity matrix. Specifically, if the gray scale of a point is closer to white, it means that the unit similarity corresponding to the point is higher, such as the point at I indicated in FIG. 2; and if the gray scale of a point is closer to black, it means that the unit similarity corresponding to the point is lower, such as the point at II indicated in FIG. 2.

It should be noted that in actual operation, it is not necessary to calculate each unit similarity as in S20 first and then determine the similarity matrix as in S30, but the similarity matrix may be directly determined and the corresponding unit similarity is calculated in the process of determining each point of the similarity matrix.

S40: the similarity of the first media object and the second media object is determined according to the similarity matrix. Specifically, the so-called determination of similarity includes: the similarity of the first media object and the second media object is determined according to the similarity matrix and the similarity is reflected using a comparison score, and/or the start and end time of matching segments of the first media object and the second media object is determined according to the similarity matrix. The comparison score may be a score between 0 and 1, and the larger the number is, the more similar the two media objects are.

The method for comparing media features according to the embodiment of the present disclosure determines the similarity of the media objects based on the similarity matrix of the two media objects, which can improve the efficiency and accuracy of media comparison.

In some embodiments of the present disclosure, S40 includes: the similarity of the first media object and the second media object is determined according to a straight line in the similarity matrix.

It should be noted that the media feature sequence generally contains a finite number of media feature units, thus the similarity matrix is a finite matrix, so in fact the so-called "straight line" is a line segment with a finite length composed of a plurality of points in the similarity matrix. The straight line has a slope which is the slope of a line connecting the plurality of points included in the straight line. In addition, the start point and the end point of the straight line may be any point in the similarity matrix, and need not be the point located at the edge.

The straight line mentioned in the present disclosure includes a diagonal line in the similarity matrix, line segments parallel to the diagonal line which have a slope of 1 from top left to bottom right in the similarity matrix (like straight line III indicated in FIG. 2), and also includes straight lines the slope of which is not 1. For example, it may be a straight line the slope of which is approximately 1, so as to improve the robustness of media comparison; may be a straight line with a slope of 2, 3, . . . , or ½, ⅓, . . . , etc., so as to deal with the comparison of media objects which have undergone speed regulation; or may even be a straight line with a negative slope (a straight line from bottom left to top right in the similarity matrix), so as to deal with media objects which have undergone reverse playback processing. The diagonal line is a line segment composed of points located at (1, 1), (2, 2), (3, 3) . . . (in fact, it is a straight line with a slope of 1 starting from the point in the upper left corner)

In fact, each straight line in the similarity matrix is composed of a plurality of unit similarities arranged in sequence. Therefore, since each straight line represents the similarity of a plurality of media feature unit pairs arranged in sequence, the similarity of a first media object segment and a second media object segment may be reflected. Each media feature unit pair includes a first media feature unit and a second media feature unit. That is, each straight line represents the similarity of a plurality of first media feature units arranged in sequence and a plurality of second media feature units arranged in sequence. The slope, start point and end point of the straight line show the length and position of the two media segments. For example, the straight line formed by (1, 1),), (3, 5), (4, 7) manifests the similarity of the first media feature unit with ordinal number 1 and the second media feature unit with ordinal number 1, the similarity of the first media feature unit with ordinal number 2 and the second media feature unit with ordinal number 3, . . . , therefore, the straight line may reflect the similarity of a first media object segment corresponding to the first media feature units with ordinal numbers 1, 2, 3 and 4 and a second media object segment corresponding to the second media feature units with ordinal numbers 1, 3, 5 and 7.

Therefore, the similarity of two media objects may be determined according to the straight line in the similarity matrix: the average (or overall) condition of all unit similarities contained in a straight line may be defined as a linear similarity of the straight line, which may reflect the similarity of the plurality of corresponding first media feature units and second media feature units; a straight line with the maximum linear similarity in the similarity matrix is determined and may be called a matching straight line; and the linear similarity of the matching straight line is determined as the similarity of the first media object and the second media object, and/or the matching segments of the first media object and the second media object are determined according to a plurality of first media feature units and second media feature units corresponding to the matching straight line.

The specific method for determining the matching segments according to the straight line (e.g., the matching straight line) in the similarity matrix may include: the start time of the matching segment in the first media object is determined according to the ordinal number (or horizontal coordinate in the similarity matrix) of the first media feature unit corresponding to the start point of the straight line, and the start time of the matching segment in the second media object is determined according to the ordinal number (or longitudinal coordinate in the similarity matrix) of the second media feature unit corresponding to the start point; similarly, the end time of the matching segment in the first media object is determined according to the horizontal coordinate of the end point of the straight line, and the end time of the matching segment in the second media object is determined according to the longitudinal coordinate of the end point.

It should be noted that in the process of determining the matching straight line, a straight line with the maximum linear similarity may be determined from a plurality of preset straight lines, for example, the plurality of preset straight lines are all straight lines with a preset slope value (for example, a slope of 1), or a plurality of points which lead to higher unit similarity ranks may be selected from the similarity matrix, and then a straight line is fitted according to the points to generate a straight line with the maximum linear similarity.

In the method for comparing media features according to the embodiment of the present disclosure, the similarity and/or matching segments of the two media objects are determined according to the straight line in the similarity matrix, so that the efficiency and accuracy of media comparison can be greatly improved.

Figure 3:
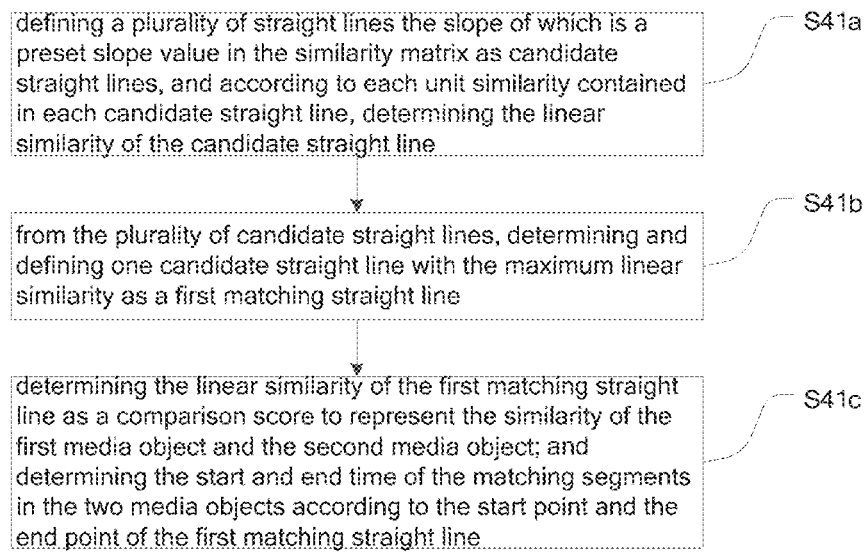
FIG. 3 is a flowchart of comparison using a dynamic programming method according to one embodiment of the present disclosure.

In a specific embodiment of the present disclosure, a dynamic programming method may be used to determine the similarity of the two media objects according to the similarity matrix. FIG. 3 is a schematic flowchart of comparison using a dynamic programming method according to one embodiment of the present disclosure. Referring to FIG. 3, in one embodiment, S40 in the present disclosure includes the following specific steps:

S41a: a plurality of straight lines the slope of which is a preset slope value in the similarity matrix are defined as candidate straight lines, and according to each unit similarity contained in each candidate straight line, the linear similarity of the candidate straight line is determined. Specifically, the linear similarity of a straight line may be set as the average value of the unit similarities contained in the straight line, or may be set as the sum of value of the unit similarities contained in the straight line. In a specific example, the preset slope value may be 1, that is, the aforementioned candidate straight lines are diagonal lines in the similarity matrix and straight lines parallel to the diagonal lines. Then proceed to S41b.

It should be noted that in one embodiment of the present disclosure, S41a further includes: the straight lines of which the number of contained unit similarities is less than a preset straight line length value are excluded from the candidate straight lines, and then S41b is proceeded to. In other words, in the present embodiment, the candidate straight lines should also satisfy that the number of contained unit similarities reaches the preset straight line length value. By excluding the straight lines with too few unit similarities, the problem that the accuracy of a final comparison result is affected when the unit similarities contained in the straight lines are too few may be eliminated.

S41b: from the plurality of candidate straight lines, one candidate straight line with the maximum linear similarity is determined and defined as a first matching straight line. Then proceed to S41c.

S41c: the linear similarity of the first matching straight line is determined as a comparison score to represent the similarity of the first media object and the second media object; and the start and end time of the matching segments in the two media objects is determined according to the start point and the end point of the first matching straight line.

It should be noted that in some embodiments of the present disclosure, there may be multiple preset slope values in S41a, i.e., the candidate straight lines are straight lines with a slope equal to any one of the multiple preset slope values, for example, the candidate straight lines may be straight lines with a slope of 1, −1, 2, ½, etc., and in S41b, a first matching straight line is determined from the plurality of candidate straight lines with a slope equal to any one of the multiple preset slope values.

In the method for comparing media features according to the present disclosure, by determining the comparison score and/or determining the matched media segments with the dynamic programming method, the accuracy and speed of comparison can be improved.

Figure 4:
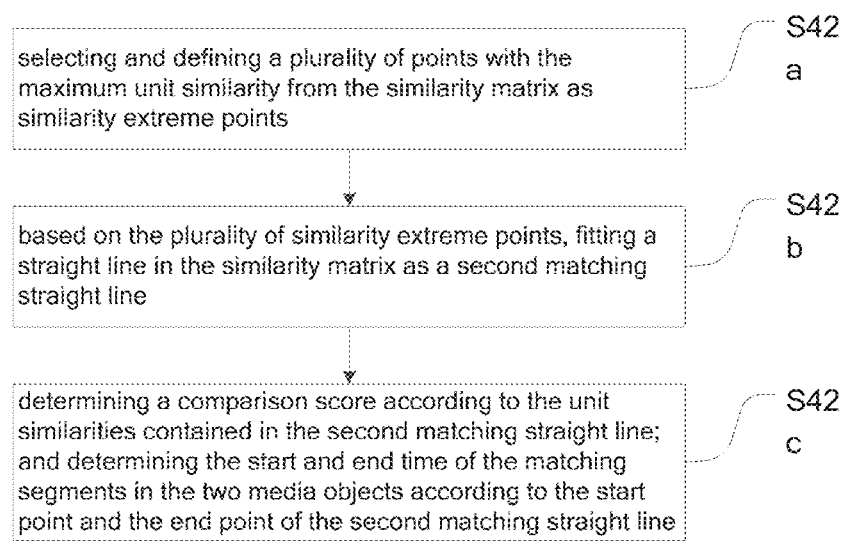
FIG. 4 is a flowchart of comparison using a linear media method according to one embodiment of the present disclosure.

In another specific embodiment of the present disclosure, a linear media method may also be used to determine the similarity of two media objects according to the similarity matrix. FIG. 4 is a schematic flowchart of comparison using a linear media method according to one embodiment of the present disclosure. Referring to FIG. 4, in one embodiment, S40 in the present disclosure includes the following specific steps:

S42a: a plurality of points with the maximum unit similarity are selected from the similarity matrix and defined as similarity extreme points. The specific number of the selected similarity extreme points may be preset. Then proceed to S42b.

S42b: based on the plurality of similarity extreme points, a straight line is fitted in the similarity matrix as a second matching straight line. In some specific examples, a straight line with a slope equal to or close to the preset slope value is fitted as the second matching straight line based on the plurality of similarity extreme points, for example, a straight line with a slope close to 1 is fitted. Specifically, a random sample consensus (RANSAC) method may be used to fit a straight line with a slope close to the preset slope value in the similarity matrix. The RANSAC method is a commonly used method for calculating the mathematical model parameters of data based on a group of sample data sets containing abnormal data, so as to obtain valid sample data. Then proceed to S42c.

S42c: a comparison score is determined according to the plurality of unit similarities included in the second matching line to represent the similarity of the first media object and the second media object. Specifically, the average value of the unit similarities on the second matching straight line may be determined as the comparison score. In addition, the start and end time of the matching segments in the two media objects may be determined according to the start and end points of the second matching straight line.

In the method for comparing media features according to the present disclosure, by determining the comparison score and/or determining the matched media segments with the linear media method, the accuracy and speed of comparison can be improved.

In some embodiments of the present disclosure (e.g., the aforementioned embodiments shown in FIGS. 3 and 4), S40 further includes: the start and end portions of the obtained first matching straight line or second matching straight line are detected, whether the points (unit similarities) of the start and end portions of the first matching straight line/second matching straight line reach a preset unit similarity value is judged, the portions of the start and end of the first matching straight line/second matching straight line that do not reach the preset unit similarity value (i.e., low unit similarities) are removed, and the middle segment of the straight line is kept and defined as a third matching straight line; according to the linear similarity of the third matching straight line, the similarity of the first media object and the second media object is determined, and/or according to the start and end points of the third matching straight line, the start and end time of the matching segments of the first media object and the second media object is determined. By removing the portions with low similarities at the start and end of the matching straight line and keeping the middle segment of the straight line with high similarities, and then determining the similarity of the first media object and the second media object, the comparison accuracy can be improved, and the start and end time of the matching segments can be more accurately obtained.

The specific method for removing the portions at the start/end of the matching straight line that do not reach the preset unit similarity value may be as follows: checking is carried out from the start/end point to the middle of the matching straight line in sequence to judge whether the preset unit similarity value is met, and after finding the first point which reaches the preset unit similarity value, a plurality of points from the point to the start/end point are removed.

It should be noted that the preset unit similarity value may be a specific unit similarity value, and whether a point reaches the value is judged during checking; and it may also be a proportional value, and whether a point reaches the proportional value compared with the average value or the maximum value of all points contained in the first matching straight line/the second matching straight line is judged during checking.

Further, the similarity matrix may be obtained by comprehensively considering various media similarities. Specifically, in the embodiment of the present disclosure, a plurality of types of first media feature sequences of the first media object and a plurality of types of second media feature sequences of the second media object acquired by a plurality of extraction methods may be simultaneously obtained, and the similarity matrix may be determined according to the plurality of types of first media feature sequences and the plurality of types of second media feature sequences. Then the similarity matrix based on the various types of media feature sequences is used to determine the similarity of the two media objects.

Figure 5:
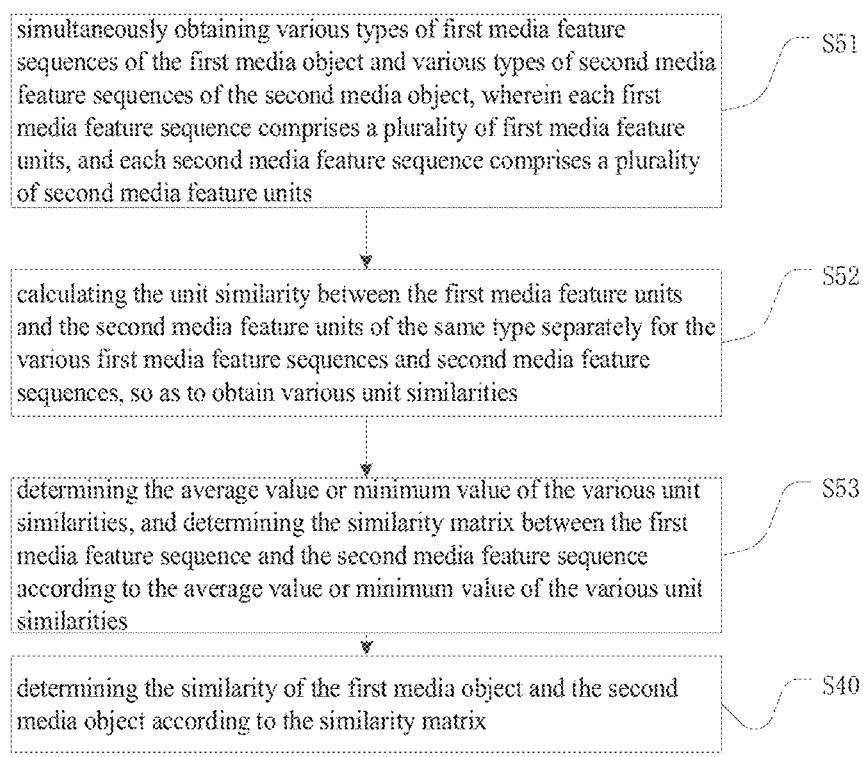
FIG. 5 is a flowchart of determining a similarity matrix based on various types of media feature sequences according to one embodiment of the present disclosure.

FIG. 5 is a schematic flowchart of determining a similarity matrix based on various types of first media feature sequences and second media feature sequences for media feature comparison according to one embodiment of the present disclosure. Referring to FIG. 5, the method for comparing media features in one embodiment of the present disclosure specifically includes:

S51: various types of first media feature sequences of the first media object and various types of second media feature sequences of the second media object acquired by a plurality of extraction methods are simultaneously obtained, wherein each first media feature sequence includes a plurality of first media feature units, and each second media feature sequence includes a plurality of second media feature units. For example, the aforementioned floating point number feature sequence and binary feature sequence of the first media object and the second media object are simultaneously obtained. Then proceed to S52.

S52: for the various first media feature sequences and second media feature sequences, the unit similarity between the first media feature units and the second media feature units of the same type is calculated separately, specifically, each unit similarity may be determined by using the process shown in S20 in the previous embodiment. In this way, various unit similarities are obtained corresponding to the various types of media feature sequences. Then proceed to S53.

S53: the average value of the various unit similarities is determined, and the similarity matrix between the first media feature sequence and the second media feature sequence is determined according to the average value of the various unit similarities; or, the minimum value of the various unit similarities is determined, and the similarity matrix is determined according to the minimum value of the various unit similarities, specifically, the similarity matrix may be determined by using the process shown in S30 in the previous embodiment.

Then proceed to S40 of the previous example, and in S40, the similarity of the first media object and the second media object is determined using the similarity matrix obtained based on the various unit similarities.

The effect of determining the similarity matrix by using the average value or minimum value of the various similarities is that mismatching may be caused when media features are compared by using the similarity obtained by a single media feature (such as the aforementioned similarity matrix, linear similarity; etc.), and the mismatching problem may be reduced or eliminated by taking the average value or minimum value of the similarities of various media features, thereby improving the accuracy of media feature comparison.

It should be noted that before taking the average value or minimum value of various unit similarities, it is necessary to ensure that various unit similarities have a consistent value range. For example, the value range of all types of unit similarities may be set to 0 to 1 in advance. In fact, the aforementioned examples of determining unit similarities according to cosine distance and according to Hamming distance have set the value range of the determined unit similarities to 0 to 1.

Figure 6:
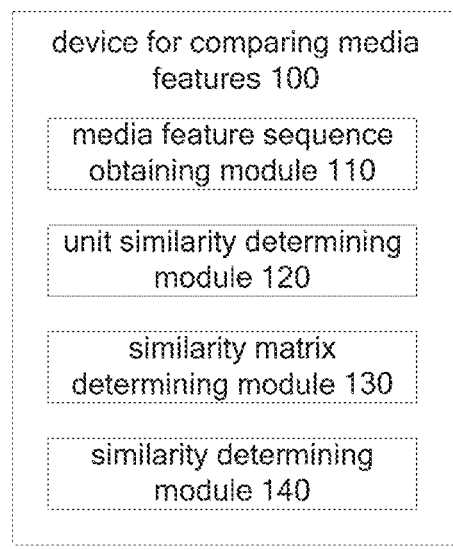
FIG. 6 is a structural block diagram of a device for comparing media features according to one embodiment of the present disclosure.

FIG. 6 is a schematic structural diagram of a device 100 for comparing media features according to one embodiment of the present disclosure. Referring to FIG. 6, the device 100 for comparing media features according to the present disclosure mainly includes a media feature sequence obtaining module 110, a unit similarity determining module 120, a similarity matrix determining module 130, and a similarity determining module 140.

The media feature sequence obtaining module 110 is used for obtaining a media feature sequence of a first media object as a first media feature sequence, and a media feature sequence of a second media object as a second media feature sequence. The first media object and the second media object are two media to be compared. Specifically, the first media feature sequence includes a plurality of first media feature units arranged in sequence, and the second media feature sequence includes a plurality of second media feature units arranged in sequence.

The unit similarity determining module 120 is used for determining the unit similarity between each first media feature unit and each second media feature unit. Each unit similarity is used to indicate the similarity of two media feature units, specifically, the greater the unit similarity, the more similar the units are.

In the embodiment of the present disclosure, when the first media feature sequence and the second media feature sequence obtained by the media feature sequence obtaining module 110 are floating point number features at the same time, the unit similarity determining module 120 includes a submodule used for determining the unit similarity according to the cosine distance (or called cosine similarity) between the first media feature unit and the second media feature unit.

In the embodiment of the present disclosure, when the first media feature sequence and the second media feature sequence obtained by the media feature sequence obtaining module 110 are binary features at the same time, the unit similarity determining module 120 includes a submodule used for determining the unit similarity according to the Hamming distance between the first media feature unit and the second media feature unit.

The similarity matrix determining module 130 is used for determining a similarity matrix between the first media feature sequence and the second media feature sequence according to each unit similarity.

It should be noted that in actual operation, the unit similarity determining module 120 and the similarity matrix determining module 130 are not necessarily independent, but the unit similarity determining module 120 may be a submodule of the similarity matrix determining module 130, and the similarity matrix determining module 130 is used for determining the similarity matrix and calculating the corresponding unit similarity in the process of determining each point of the similarity matrix.

The similarity determining module 140 is used for determining the similarity of the first media object and the second media object according to the similarity matrix. Specifically, the similarity determining module 140 is used for determining the similarity of the first media object and the second media object according to the similarity matrix and reflecting the similarity using a comparison score, and/or determining the start and end time of matching segments of the first media object and the second media object according to the similarity matrix.

In some embodiments of the present disclosure, the similarity determining module 140 includes a submodule used for determining the similarity of the first media object and the second media object according to a straight line in the similarity matrix. Specifically, the submodule is used for determining a straight line with the maximum linear similarity in the similarity matrix, which may be called a matching straight line; and determining the linear similarity of the matching straight line as the similarity of the first media object and the second media object, and/or determining the matching segments of the first media object and the second media object according to a plurality of first media feature units and second media feature units corresponding to the matching straight line.

Figure 7:
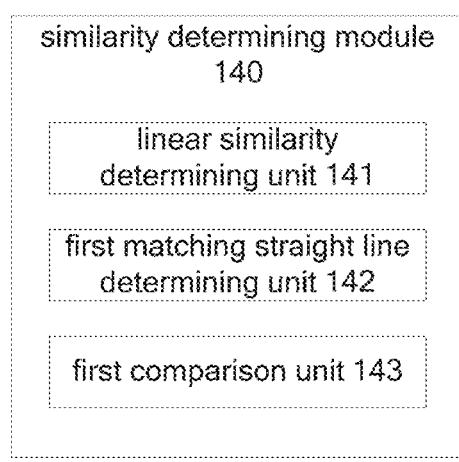
FIG. 7 is a structural block diagram of a similarity determining module according to one embodiment of the present disclosure.

In a specific embodiment of the present disclosure, the similarity determining module 140 may include a dynamic programming comparison submodule (not shown) used for determining the similarity of the two media objects according to the similarity matrix by using a dynamic programming method. FIG. 7 is a schematic structural diagram of a unit similarity determining module 140 comprising a dynamic programming comparison submodule according to one embodiment of the present disclosure. Referring to FIG. 7, in one embodiment, the similarity determining module 140 of the present disclosure includes:

a linear similarity determining unit 141 used for, according to each unit similarity contained in each candidate straight line, determining the linear similarity of the candidate straight line, wherein the candidate straight lines are a plurality of straight lines the slope of which is a preset slope value in the similarity matrix; specifically, the linear similarity of a straight line may be set as the average value of the unit similarities contained in the straight line, or may be set as the sum of value of the unit similarities contained in the straight line;

it should be noted that in one embodiment of the present disclosure, the linear similarity determining unit 141 further includes a subunit used for excluding :from the candidate straight lines the straight lines of which the number of contained unit similarities is less than a preset straight line length value; or the candidate straight lines used by the linear similarity determining unit 141 should also satisfy that the number of contained unit similarities reaches the preset straight line length value;

a first matching straight line determining unit 142 used for, from the plurality of candidate straight lines, determining and defining one candidate straight line with the maximum linear similarity as a first matching straight line; and a first comparison unit 143 used for determining the linear similarity of the first matching straight line as a comparison score to represent the similarity of the first media object and the second media object, and/or used for determining the start and end time of the matching segments in the two media objects according to the start point and the end point of the first matching straight line.

Figure 8:
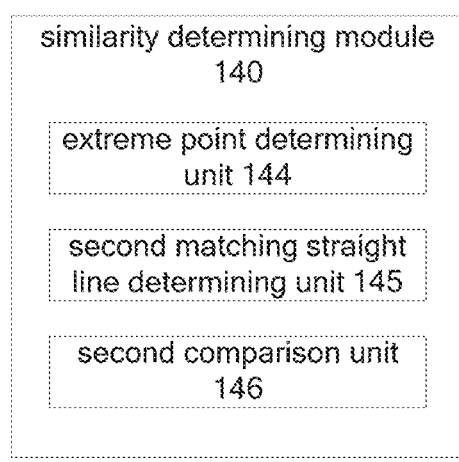
FIG. 8 is a structural block diagram of a similarity determining module according to another embodiment of the present disclosure.

In a specific embodiment of the present disclosure, the similarity determining module 140 may include a linear media comparison submodule (not shown) used for determining the similarity of the two media objects according to the similarity matrix by using a linear media method. FIG. 8 is a schematic structural diagram of a unit similarity determining module 140 comprising a linear media comparison submodule according to one embodiment of the present disclosure. Referring to FIG. 8, in one embodiment, the similarity determining module 140 of the present disclosure includes:

an extreme point determining unit 144 used for selecting and defining a plurality of points with the maximum unit similarity from the similarity matrix as similarity extreme points;

a second matching straight line determining unit 145 used for, based on the plurality of similarity extreme points, fitting a straight line in the similarity matrix as a second matching straight line; in some examples, the second matching straight line determining unit 145 is specially used for fitting a straight line with a slope equal to or close to the preset slope value as the second matching straight line based on the plurality of similarity extreme points; specifically, the second matching straight line determining unit 145 may be used for fitting a straight line with a slope close to the preset slope value in the similarity matrix by using a random sample consensus method;

a second comparison unit 146 used for determining a comparison score according to a plurality of unit similarities included in the second matching straight line (for example, the average value of the unit similarities on the second matching straight line may be determined as the comparison score) to represent the similarity of the first media object and the second media object, and/or determining the start and end time of the matching segments in the two media objects according to the start point and the end point of the second matching straight line.

In some embodiments of the present disclosure, the similarity determining module 140 further includes: a third matching straight line determining unit (not shown) used for detecting the start and end portions of the aforementioned first matching straight line or second matching straight line, judging whether the points (unit similarities) of the start and end portions of the first matching straight line/second matching straight line reach a preset unit similarity value, removing the portions of the start and end of the first matching straight line/second matching straight line that do not reach the preset unit similarity value (i.e., low unit similarities), and keeping and defining the middle segment of the straight line as a third matching straight line; and a third comparison unit (not shown) used for determining the comparison score according to the linear similarity of the third matching straight line, and determining the start and end time of the matching segments according to the start and end points of the third matching straight line.

Figure 9:
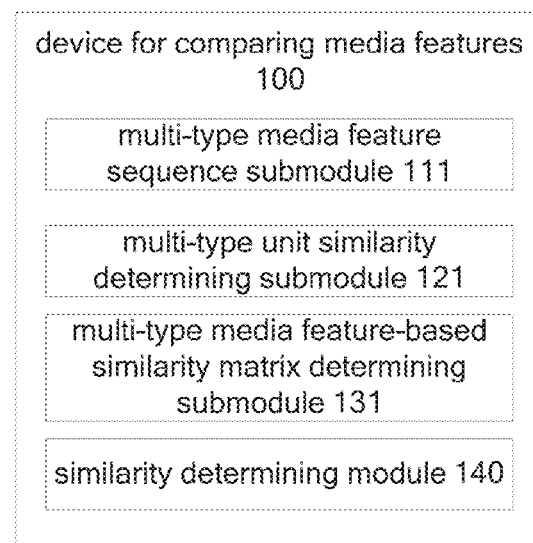
FIG. 9 is a structural block diagram of a device for comparing media features which determines a similarity matrix based on various types of media feature sequences according to one embodiment of the present disclosure.

Further, the similarity matrix may be obtained by comprehensively considering various media similarities. FIG. 9 is a structure block diagram of a device 100 for comparing media features which determines a similarity matrix based on various types of first media feature sequences and second media feature sequences according to one embodiment of the present disclosure. Referring to FIG. 9, the device 100 for comparing media features in one embodiment of the present disclosure specifically includes:

a multi-type media feature sequence submodule 111 used for obtaining various types of first media feature sequences of the first media object and various types of second media feature sequences of the second media object acquired by a plurality of extraction methods simultaneously, wherein each first media feature sequence includes a plurality of first media feature units, and each second media feature sequence includes a plurality of second media feature units;

a multi-type unit similarity determining submodule 121 used for calculating the unit similarity between the first media feature units and the second media feature units of the same type separately for the various first media feature sequences and second media feature sequences, so as to obtain various unit similarities;

a multi-type media feature-based similarity matrix determining submodule 131 used for determining the average value or minimum value of the various unit similarities, and determining the similarity matrix between the first media feature sequence and the second media feature sequence according to the average value or minimum value of the various unit similarities.

Besides, the similarity determining module 140 is specifically used for determining the similarity of the first media object and the second media object according to the similarity matrix obtained based on the various types of unit similarities.

Figure 10:
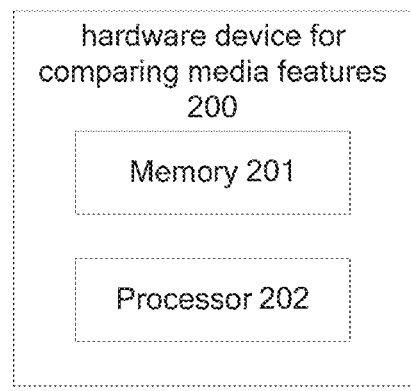
FIG. 10 is a hardware block diagram of a hardware device for comparing media features according to one embodiment of the present disclosure.

FIG. 10 is a hardware block diagram of a hardware device for comparing media features according to one embodiment of the present disclosure. As shown in FIG. 10, the hardware device 200 for comparing media features according to the embodiment of the present disclosure includes a memory 201 and a processor 202. The components in the hardware device 200 for comparing media features are interconnected by a bus system and/or other forms of connection mechanisms (not shown).

The memory 201 is used for storing non-transitory computer readable instructions. Specifically, the memory 201 may include one or more computer program products, which may include various forms of computer readable storage media, such as volatile memory and/or non-volatile memory. The volatile memory may include, for example, random access memory (RAM) and/or cache, etc. The nonvolatile memory may include, for example, read only memory (ROM), hard disk, flash memory, etc.

The processor 202 may be a central processing unit (CPU) or other forms of processing unit having data processing capability and/or instruction execution capability, and may control other components in the hardware device 200 for comparing media features to perform desired functions. In one embodiment of the present disclosure, the processor 202 is used for executing the computer readable instructions stored in the memory 201 so that the hardware device 200 for comparing media features performs all or part of the steps of the aforementioned method for comparing media features according to the embodiments of the present disclosure.

Figure 11:
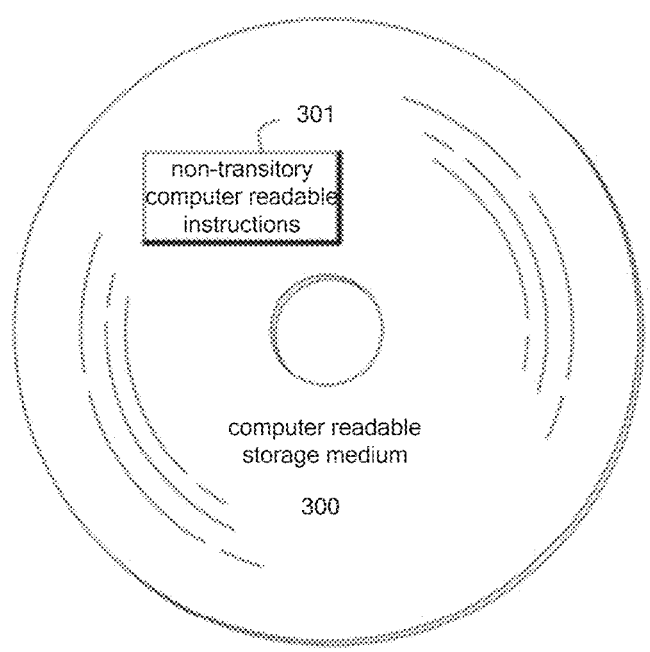
FIG. 11 is a schematic diagram of a computer readable storage medium according to one embodiment of the present disclosure.

FIG. 11 is a schematic diagram of a computer readable storage medium according to one embodiment of the present disclosure. As shown in FIG. 11, the computer readable storage medium 300 according to the embodiment of the present disclosure has non-transitory computer readable instructions 301 stored therein. When the non-transitory computer readable instructions 301 are executed by the processor, all or part of the steps of the aforementioned method for comparing media features according to the embodiments of the present disclosure are executed.

Figure 12:
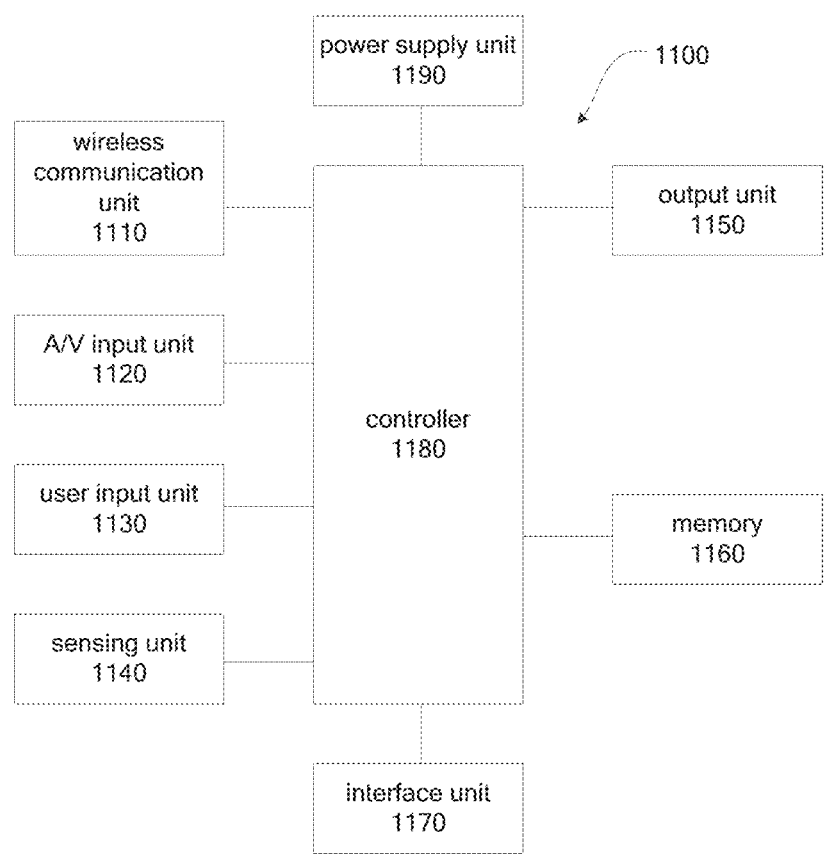
FIG. 12 is a structural block diagram of a terminal equipment according to one embodiment of the present disclosure.

FIG. 12 is a hardware structure diagram of a terminal equipment according to one embodiment of the present disclosure. The terminal equipment may be implemented in various forms, and the terminal equipment in the present disclosure may include, but is not limited to, mobile terminal equipment such as mobile phone, smart phone, notebook computer, digital broadcast receiver, personal digital assistant (PDA), PAD, portable multimedia player (PMP), navigation device, vehicle-mounted terminal equipment, vehicle-mounted display terminal, and vehicle-mounted electronic rearview minor, and fixed terminal equipments such as digital TV and desktop computer.

As shown in FIG. 12, the terminal equipment 1100 may include a wireless communication unit 1110, an A/V (audio/video) input unit 1120, a user input unit 1130, a sensing unit 1140, an output unit 1150, a memory 1160, an interface unit 1170, a controller 1180, a power supply unit 1190, and the like. FIG. 12 shows a terminal equipment having various components, but it should be understood that not all of the illustrated components are required to be implemented. More or fewer components may be implemented alternatively.

The wireless communication unit 1110 allows radio communication between the terminal equipment 1100 and a wireless communication system or network. The A/V input unit 1120 is used for receiving audio or video signals. The user input unit 1130 may generate key input data according to commands input by a user to control various operations of the terminal equipment. The sensing unit 1140 detects the current state of the terminal equipment 1100, the position of the terminal equipment 1100, the presence of touch input of a user to the terminal equipment 1100, the orientation of the terminal equipment 1100, and the acceleration or deceleration movement and direction of the terminal equipment 1100, and generates commands or signals for controlling the operation of the terminal equipment 1100. The interface unit 1170 serves as an interface through which at least one external device may be connected to the terminal equipment 1100. The output unit 1150 is configured to provide an output signal in a visual, audio, and/or tactile manner. The memory 1160 may store software programs and the like for processing and controlling operations executed by the controller 1180, or may temporarily store data which have been output or are to be output. The memory 1160 may include at least one type of storage medium. Moreover, the terminal equipment 1100 may cooperate with a network storage device which performs the storage function of the memory 1160 through network connection. The controller 1180 generally controls the overall operation of the terminal equipment. In addition, the controller 1180 may include a multimedia module for reproducing or playing back multimedia data. The controller 1180 may perform pattern recognition processing to recognize handwriting input or picture drawing input performed on a touch screen as characters or images. The power supply unit 1190 receives external power or internal power under the control of the controller 1180 and provides appropriate power required to operate various elements and components.

Various embodiments of the method for comparing media features provided by the present disclosure may be implemented by a computer readable medium using, for example, computer software, hardware, or any combination thereof. For hardware implementation, various embodiments of the method for comparing media features provided by the present disclosure may be implemented by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. In some cases, various embodiments of the method for comparing media features provided by the present disclosure may be implemented in the controller 1180. For software implementation, various embodiments of the method for comparing media features provided by the present disclosure may be implemented with a separate software module which allows at least one function or operation to be performed. A software code may be implemented by a software application program (or program) written in any suitable programming language, and the software code may be stored in the memory 1160 and executed by the controller 1180.

According to the above method and device for comparing media features, the hardware device, the computer readable storage medium and the terminal equipment of the embodiments of the present disclosure, the similarity of media objects is determined based on the similarity matrix of the two media objects, which can improve the efficiency and accuracy of media comparison. Further, the similarity and/or matching segments of the two media objects are determined according to the straight line in the similarity matrix, which can greatly improve the efficiency and accuracy of media comparison; in addition, by comparing media features based on various types of media feature sequences, the accuracy of media comparison can be greatly improved.

The basic principles of the disclosure are described above in combination with specific embodiments. However, it should be noted that the merits, advantages, effects and the like mentioned in the disclosure are only examples rather than limitations, and cannot be considered as necessary for each embodiment of the disclosure. In addition, the specific details of the disclosure are only for the purpose of example and easy to understand, but not for limitation. The details do not limit the disclosure to be realized by adopting the specific details.

The block diagrams of devices, apparatuses, equipment, and systems referred to in the present disclosure are only illustrative examples and are not intended to require or imply that connections, arrangements, and configurations must be made in the manner shown in the block diagrams. As will be realized by those skilled in the art, these devices, apparatuses, equipment and systems can be connected, arranged and configured in any way. Words such as "include", "include", "have" and so on are inclusive words, which refer to "including but not limited to", and can be used interchangeably. The words "or" and "and" used here refer to the words "and/or" and can be used interchangeably, unless the contexts indicate otherwise. The term "such as" used herein refers to the phrase "such as but not limited to" and can be used interchangeably.

In addition, as used herein, "or" used in the enumeration of items starting with "at least one" indicates a separate enumeration, so that, for example, the enumeration of "at least one of A, B or C" means A or B or C, or AB or AC or BC, or ABC (i.e., A and B and C). Furthermore, the phrase "exemplary" does not mean that the described example is preferred or better than other examples.

It should also be noted that in the systems and methods of the present disclosure, the components or steps can be decomposed and/or recombined. These decompositions and/or reconstitutions shall be considered as equivalent to the present disclosure.

Various changes, substitutions, and modifications of the techniques herein may be made without departing from the techniques taught by the appended claims. In addition, the scope of the claims of the present disclosure is not limited to the specific aspects of the above-mentioned processing, machine, manufacturing, composition, means, methods and actions of the event. The components, means, methods or actions of processes, machines, manufacturing, events that currently exist or are to be developed later can be implemented with substantially the same functions or achieve substantially the same results as the corresponding aspects described herein. Therefore, the appended claims include the composition, means, methods or actions of such processes, machines, manufacturing and events within their scope.

The above description of the disclosed aspects is provided to enable any person skilled in the art to make or use the disclosure. Various modifications to these aspects are apparent to those skilled in the art, and the general principles defined herein may be applied to other aspects without departing from the scope of the present disclosure. Therefore, the present disclosure is not intended to be limited to the aspects shown herein, but in accordance with the widest range consistent with the principles and novel features disclosed herein.

The above description has been given for the purpose of illustration and description. Furthermore, this description is not intended to limit embodiments of the present disclosure to the form disclosed herein. Although a plurality of exemplary aspects and embodiments have been discussed above, those skilled in the art will recognize certain variations, modifications, changes, additions and sub combinations thereof.

The invention claimed is:

1. A method for comparing media features, comprising:
   obtaining first media feature sequences of a first media object and second media feature sequences of a second media object, wherein the first media feature sequences comprise a plurality of first media feature units arranged in sequence, wherein the second media feature sequences comprise a plurality of second media feature units arranged in sequence, and wherein the obtaining first media feature sequences of a first media object and second media feature sequences of a second media object further comprises:
      obtaining various types of first media feature sequences of the first media object, and
      obtaining various types of second media feature sequences of the second media object;
   determining unit similarities between the first media feature units and the second media feature units, wherein the determining unit similarities between the first media feature units and the second media feature units further comprises determining unit similarity between the first media feature units and the second media feature units of a same type separately so as to obtain the unit similarities comprising various unit similarities;
   determining a similarity matrix between the first media feature sequences and the second media feature sequences according to the unit similarities, wherein the determining a similarity matrix between the first media feature sequences and the second media feature sequences according to the unit similarities further comprises:
      determining an average value or a minimum value of the various unit similarities, and
      determining the similarity matrix according to the average value or the minimum value of the various unit similarities; and
   determining a similarity of the first media object and the second media object according to the similarity matrix.

2. The method for comparing media features according to claim 1, wherein the plurality of first media feature units are arranged in chronological order in the first media feature sequences, and the plurality of second media feature units are arranged in chronological order in the second media feature sequences, wherein one point in the similarity matrix corresponds to one unit similarity, and the points of the similarity matrix are arranged according to the sequence of the first media feature units in the first media feature sequences in a transverse direction and according to the sequence of the second media feature units in the second media feature sequences in a longitudinal direction.

3. The method for comparing media features according to claim 2, wherein the determining a similarity of the first media object and the second media object according to the similarity matrix comprises: determining a similarity and matching segments of the first media object and the second media object according to a straight line in the similarity matrix.

4. The method for comparing media features according to claim 3, wherein the determining a similarity of the first media object and the second media object according to a straight line in the similarity matrix comprises:
defining a plurality of straight lines with a slope being a preset slope value as candidate straight lines, and according to an average value or sum value of unit similarities contained in each candidate straight line, determining a linear similarity of the candidate straight line;
from the plurality of candidate straight lines, selecting and defining one candidate straight line with the maximum linear similarity as a first matching straight line;
determining the similarity of the first media object and the second media object according to the linear similarity of the first matching straight line; and determining a start and end time of matching segments of the first media object and the second media object according to a start point and an end point of the first matching straight line.

5. The method for comparing media features according to claim 4, wherein a plurality of preset slope values are set, and the candidate straight line is a straight line with a slope equal to any one of the plurality of preset slope values.

6. The method for comparing media features according to claim 2, wherein the determining a similarity of the first media object and the second media object according to the similarity matrix comprises:
selecting a plurality of points with the maximum unit similarity from the similarity matrix as similarity extreme points;
fitting a straight line in the similarity matrix as a second matching straight line based on the similarity extreme points;
determining the similarity of the first media object and the second media object according to an average value or sum value of unit similarities contained in the second matching straight line; and determining a start and end time of matching segments of the first media object and the second media object according to a start point and an end point of the second matching straight line.

7. The method for comparing media features according to claim 6, wherein the fitting a straight line in the similarity matrix as a second matching straight line based on the similarity extreme points comprises: fitting a straight line with a slope equal to or close to a preset slope value in the similarity matrix by using a random sample consensus method as the second matching straight line.

8. The method for comparing media features according to claim 4, wherein the determining a similarity of the first media object and the second media object according to the similarity matrix further comprises:
judging whether points at a start and an end of the first matching straight line reach a preset unit similarity value, removing portions of the start and the end that do not reach the preset unit similarity value, and keeping and defining a middle segment of the straight line as a third matching straight line; and
determining the similarity of the first media object and the second media object according to the linear similarity of the third matching straight line, and determining a start and end time of matching segments according to a start point and an end point of the third matching straight line.

9. A device for comparing media features, comprising:
a memory, configured to store non-transitory computer readable instructions; and
a processor, configured to execute the computer readable instructions to perform operations when the computer readable instructions are executed by the processor; the operations comprising:
obtaining first media feature sequences of a first media object and second media feature sequences of a second media object, wherein the first media feature sequences comprise a plurality of first media feature units arranged in sequence, wherein the second media feature sequences comprise a plurality of second media feature units arranged in sequence,. and wherein the obtaining first media feature sequences of a first media object and second media feature sequences of a second media object further comprises:
obtaining various types of first media feature sequences of the first media object, and
obtaining various types of second media feature sequences of the second media object;
determining unit similarities between the first media feature units and the second media feature units, wherein the determining unit similarities between the first media feature units and the second media feature units further comprises determining unit similarity between the first media feature units and the second media feature units of a same type separately so as to obtain the unit similarities comprising various unit similarities;
determining a similarity matrix between the first media feature sequences and the second media feature sequences according to the unit similarities, wherein the determining a similarity matrix between the first media feature sequences and the second media feature sequences according to the unit similarities further comprises:
determining an average value or a minimum value of the various unit similarities, and
determining the similarity matrix according to the average value or the minimum value of the various unit similarities; and
determining a similarity of the first media object and the second media object according to the similarity matrix.

10. A non-transitory computer readable storage medium for storing non-transitory computer readable instructions, wherein, when the non-transitory computer readable instructions are executed by a computer, such that the computer perform operations comprising:
obtaining first media feature sequences of a first media object and second media feature sequences of a second media object, wherein the first media feature sequences comprise a plurality of first media feature units arranged in sequence, wherein the second media feature sequences comprise a plurality of second media feature units arranged in sequence, and wherein the obtaining first media feature sequences of a first media object and second media feature sequences of a second media object further comprises:
obtaining various types of first media feature sequences of the first media object, and
obtaining various types of second media feature sequences of the second media object;
determining unit similarities between the first media feature units and the second media feature units, wherein the determining unit similarities between the first media feature units and the second media feature units further comprises determining unit similarity between the first media feature units and the second media feature units of a same type separately so as to obtain the unit similarities comprising various unit similarities;
determining a similarity matrix between the first media feature sequences and the second media feature sequences according to the unit similarities, wherein the determining a similarity matrix between the first media feature sequences and the second media feature sequences according to the unit similarities further comprises:
determining an average value or a minimum value of the various unit similarities, and
determining the similarity matrix according to the average value or the minimum value of the various unit similarities; and
determining a similarity of the first media object and the second media object according to the similarity matrix.

11. The method for comparing media features according to claim 6, wherein the determining a similarity of the first media object and the second media object according to the similarity matrix further comprises:
judging whether points at a start and an end of the second matching straight line reach a preset unit similarity value, removing portions of the start and the end that do not reach the preset unit similarity value, and keeping and defining a middle segment of the straight line as a third matching straight line; and
determining the similarity of the first media object and the second media object according to the linear similarity of the third matching straight line, and determining a start and end time of matching segments according to a start point and an end point of the third matching straight line.

12. The device according to claim 9, wherein the plurality of first media feature units are arranged in chronological order in the first media feature sequences, and the plurality of second media feature units are arranged in chronological order in the second media feature sequences, and wherein one point in the similarity matrix corresponds to one unit similarity, and the points of the similarity matrix are arranged according to the sequence of the first media feature units in the first media feature sequences in a transverse direction and according to the sequence of the second media feature units in the second media feature sequences in a longitudinal direction.

13. The device according to claim 12, wherein the determining a similarity of the first media object and the second media object according to the similarity matrix comprises:
determining a similarity and matching segments of the first media object and the second media object according to a straight line in the similarity matrix.

14. The device according to claim 13, wherein the determining a similarity of the first media object and the second media object according to a straight line in the similarity matrix comprises:
defining a plurality of straight lines with a slope being a preset slope value as candidate straight lines, and according to an average value or sum value of unit similarities contained in each candidate straight line, determining a linear similarity of the candidate straight line;
from the plurality of candidate straight lines, selecting and defining one candidate straight line with the maximum linear similarity as a first matching straight line;
determining the similarity of the first media object and the second media object according to the linear similarity of the first matching straight line; and determining a start and end time of matching segments of the first media object and the second media obj ect according to a start point and an end point of the first matching straight line.

15. The device according to claim 14, wherein a plurality of preset slope values are set, and the candidate straight line is a straight line with a slope equal to any one of the plurality of preset slope values.

16. The device according to claim 12, wherein the determining a similarity of the first media object and the second media object according to the similarity matrix comprises:
selecting a plurality of points with the maximum unit similarity from the similarity matrix as similarity extreme points;
fitting a straight line in the similarity matrix as a second matching straight line based on the similarity extreme points;
determining the similarity of the first media object and the second media object according to an average value or sum value of unit similarities contained in the second matching straight line; and determining a start and end time of matching segments of the first media object and the second media object according to a start point and an end point of the second matching straight.

17. The device according to claim 14, wherein the determining a similarity of the first media object and the second media object according to the similarity matrix further comprises:
judging whether points at a start and an end of the first matching straight line reach a preset unit similarity value, removing portions of the start and the end that do not reach the preset unit similarity value, and keeping and defining a middle segment of the straight line as a third matching straight line; and
determining the similarity of the first media object and the second media object according to the linear similarity of the third matching straight line, and determining a start and end time of matching segments according to a start point and an end point of the third matching straight line.

18. The device according to claim 16, wherein the determining a similarity of the first media object and the second media object according to the similarity matrix further comprises:
judging whether points at a start and an end of the second matching straight line reach a preset unit similarity value, removing portions of the start and the end that do not reach the preset unit similarity value, and keeping and defining a middle segment of the straight line as a third matching straight line; and determining the similarity of the first media object and the second media object according to the linear similarity of the third matching straight line, and determining a start and end time of matching segments according to a start point and an end point of the third matching straight line.

\* \* \* \* \*